United States Patent

Baker

[15] 3,705,391

[45] Dec. 5, 1972

[54] MEMORY SYSTEM EMPLOYING CAPACITANCE STORAGE MEANS

[72] Inventor: Richard H. Baker, Bedford, Mass.

[73] Assignee: Massachusetts Institute of Technology, Cambridge, Mass.

[22] Filed: Oct. 22, 1971

[21] Appl. No.: 191,913

Related U.S. Application Data

[63] Continuation-in-part of Ser. No. 797,953, Feb. 10, 1969.

[52] U.S. Cl..............340/173 CA, 320/1, 340/173 R, 340/173 LS

[51] Int. Cl........G11c 11/24, G11c 7/00, G11c 11/42

[58] Field of Search......340/173 R, 173 LS, 173 CA; 320/1

[56] References Cited

UNITED STATES PATENTS

| | | | |
|---|---|---|---|
| 3,142,822 | 7/1964 | Martin | 340/173 CA |
| 3,142,824 | 7/1964 | Hill | 320/1 X |
| 3,351,837 | 11/1967 | Owen | 320/1 |
| 3,484,777 | 12/1969 | Delagrange | 320/1 X |
| 3,354,499 | 11/1967 | McGregor | 320/1 X |

*Primary Examiner*—Howard W. Britton
*Assistant Examiner*—Stuart Hecker
*Attorney*—Arthur A. Smith, Jr. et. al.

[57] ABSTRACT

Memory apparatus is disclosed wherein digital information in the form of message units is stored in capacitance arrays. Each message unit is converted to an M-level voltage determined by the bit content of the unit and the M-level voltage is transferred to an individual capacitance for storage; once information has been stored, the power to the system can be removed. Appropriately programmed switching enables the storage of many message units sequentially upon individual capacitances. Small physical size requirements of the memory for preferred uses as well as reliability of the switch system are met by field effect transistors which, however, allow charge leakage from the capacitances. It is necessary, therefore, that the memory periodically be updated or restored. Updating is effected by feeding the M-level voltage signals on the capacitances individually and sequentially to one input of a comparator and feeding to the other input thereof an analog signal representing the lowest number of bits greater than or equal to the message unit represented by the displayed signal on the particular capacitance. The analog signal thus determined is then connected to the particular capacitance and/or the digital message unit from which the analog signal is derived can be passed to a readout device. The memory has other uses, one of which, that of image pickup in a solid state camera, is discussed in detail.

15 Claims, 8 Drawing Figures

PATENTED DEC 5 1972 3,705,391

SHEET 1 OF 5

INVENTOR:
RICHARD H. BAKER
BY Robert Shaw
ATTORNEY

INVENTOR:
RICHARD H. BAKER
BY [signature]
ATTORNEY

INVENTOR
RICHARD H. BAKER

BY [signature]

ATTORNEY

INVENTOR
RICHARD H. BAKER

BY Robert Shaw

ATTORNEY

INVENTOR
RICHARD H. BAKER
BY
ATTORNEY

MEMORY SYSTEM EMPLOYING CAPACITANCE STORAGE MEANS

This is a continuation-in-part of application for Letters Patent Ser. No. 797,953 filed Feb. 10, 1969.

The invention described herein was made in the performance of work under a NASA contract and is subject to the provisions of Section 305 of the National Aeronautics and Space Act of 1958, Public Law 85-568 (72 Stat. 435; 42 U.S.C. 2457).

The present invention relates to analog memory apparatus wherein, for example, a binary message unit consisting of a plurality of bits is converted to an M-level voltage signal and the voltage is stored on a capacitance, means being provided to read the stored signal and/or restore the signal to its original level to compensate for charge leakage from the capacitance.

There is a need in, for example, space vehicles and the like for medium capacity memories which meet power, size and weight constraints, and yet provide reliability. In some space systems, tape recorder memories, flip-flop registers, core memories and films have been used, but these have often proved unreliable or require a considerable amount of power to operate. An object of the present invention, accordingly, is to provide a medium capacity memory system useful in such space vehicles, but of more general utility, as well.

Another object is to provide a memory system employing analog storage and pulse power, the capacitance storage being particularly well suited for storage of digital words having word lengths of six bits or less and message sizes of the order of 500 words or less.

In order to meet the reliability and size constraints imposed, transistors and, preferably, field effect transistors are used as switching means to charge and discharge the capacitance storage. One difficulty encountered in capacitance storage systems using such transistor switches is that of charge leakage from the individual storage capacitance of which the system is composed. Accordingly, still another object is to provide a capacitance storage system having means for periodically updating the messages stored, that is, returning the storage capacitances to the voltage level representative of the digital word originally stored.

A still further object is to provide a system of the above character wherein the original message in the memory system is derived from light directed into a solid-state camera, the memory being located at the image plane of the camera to record an image in the form of M-level voltages in a matrix comprising a plurality of capacitance charging circuits.

Other and still further objects are discussed in the description to follow and are particularly delineated in the appended claims.

The objects of the invention are generally attained in analog apparatus adapted to store digital information comprising a plurality of message units, that comprises, means for converting each of the message units to a voltage signal, the level of the signal being determined by the bit content of the message unit represented and capacitance means to receive and store said voltage signal. Switches are supplied to connect individual capacitances of the capacitance means to the converter to transfer the signal from the converter to the individual capacitances. A control means effects operation of the switches thereby to determine which of said capacitances shall receive any particular signal. The switches are further adapted to display the signal on any particular capacitance to a comparator, the comparator being connected to receive also an output signal from the converter representative of the lowest number of digital bits greater than or equal to the message unit represented by the displayed signal on said particular capacitance thereby to determine the voltage level of the said displayed signal in terms of its digital equivalent.

The invention will now be explained with reference to the accompanying drawings in which, FIG. 1 is a schematic circuit diagram, partially in block form, of an embodiment of the invention;

Prior to a detailed discussion of specific details of the invention, it is in order to discuss, briefly, the overall concept hereinvolved. As previously mentioned, there exists a need for reliable, light weight, medium-speed low-power storage memories. The capacitance memories herein described, using as they do pulse-powered techniques and being adapted to employ integrated circuitry, provide many of the desired characteristics to fill the need. The use of analog storage and pulse power is described in an article entitled PULSE POWERED CIRCUITS by Baker (the present inventor) et al., IEEE Transactions on Electronic Computers, June, 1966, at page 321 et seq. The concept is extended here to embrace storage of multiple-bit message units on one capacitance, each message unit being converted to an analog voltage signal which is stored on an individual capacitance of an array. By sequentially depositing such analog signals on a plurality of capacitances, many such multiple-bit message units can be stored in the form of their analog equivalents. Once the information is entered on the memory device, the system power can be removed.

Figures 2, 3:
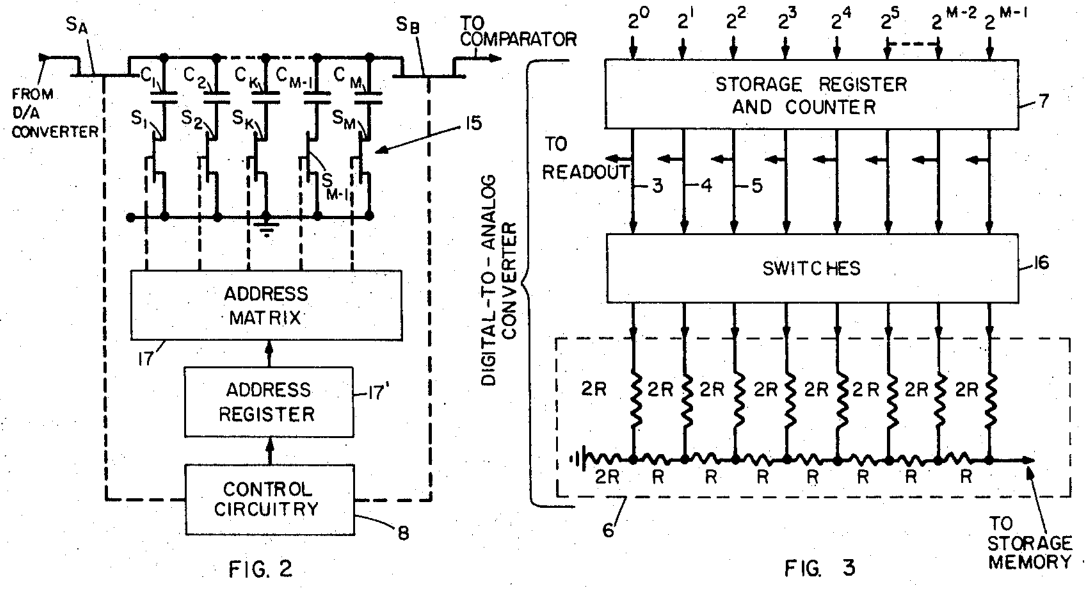
FIGS. 2 and 3 are schematic circuit diagrams, partially in block diagram form, of portions of the circuit of FIG. 1.

In the present memory, an analog signal is transferred to a particular capacitance, as for example, any one of the plurality of storage capacitances $C_1$, $C_2$, $C_k$, etc., in FIG. 2 by closing associated electric switching devices $S_1$, $S_2$, $S_k$, etc., respectively, in a manner discussed in detail hereinafter, and a switch $S_A$, the storage capacitances $C_1$, $C_2$, $C_k$ and the respective switches $S_1$, $S_2$, $S_k$ etc. in the above-disclosed embodiment, acting in combination to form capacitance charging circuits in the array to store digital information represented by the analog voltage signal previously mentioned. In order to provide the switching speeds, small size and reliability contemplated, the switches $S_1$, $S_2$, $S_k$, etc., are preferably of the field effect transistor type. Field effect transistors act as very low resistances in the "on" state and as very high resistances in the "off" state. There is, thus, some leakage in the off state, which results in voltage decay and loss of analog signal in the absence of corrective measures. The corrective measure taken is to re-digitize the message units and pass the re-digitized units to the memory as analog signals thereby to return the voltage level on each of the capacitances to the original level.

Since the memory discussed is intended for multiple-bit messages each represented by an M-level voltage signal, any leakage current from the storage capacitance must be replaced before the voltage signal is reduced one bit level. The amount of leakage will depend upon the leakage characteristics of the capacitances, but will, in the present device, depend to a greater extent upon the characteristics of the transistors. The generally preferred semi-conductor devices for present purposes are metal oxide field effect transistors (MOSFET) and junction field effect transistors (JFET), each of which may be made of silicon or germanium. Leakage in such devices is a function of voltage, temperature and other parameters inherent in the particular type of device. Generally speaking, however, silicon devices in the off or reverse bias condition have leakage of the order of $10^{-10}$ amperes and germanium devices, the order of $10^{-4}$ amperes. Leakage in all devices varies with temperature and with voltage, the amount of such leakage depending on the device and voltage bias.

The message size of the memory is limited by the time necessary to update and updating time, in turn, is a function of the conversion time from digital-to-analog, the RC constants of the memory circuit, and the change in voltage between updatings. Changes in conversion time can be effected by changing clock frequency, but other factors place a high-level ceiling on frequency.

Figure 1:
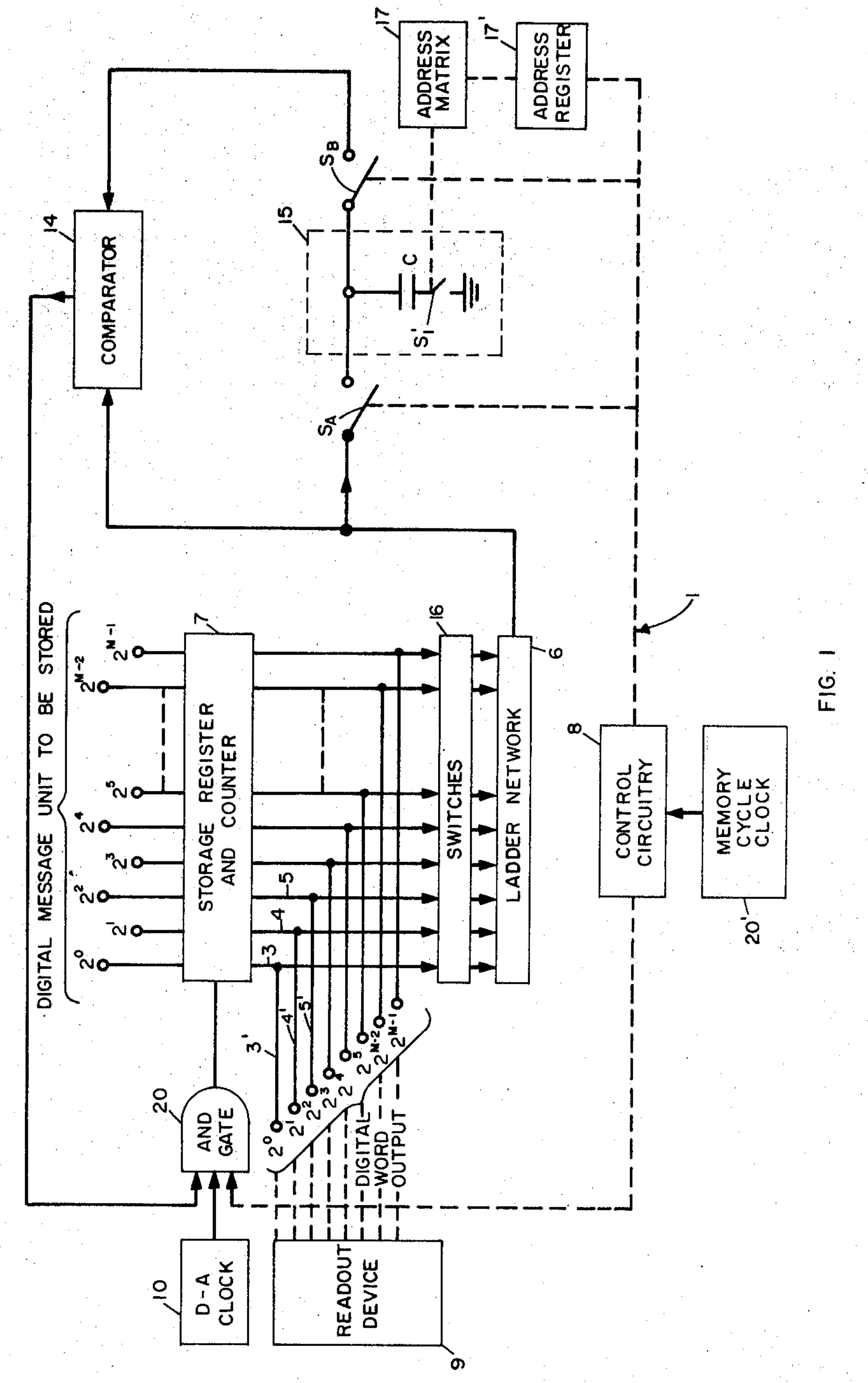

For a detailed explanation, reference is now made to FIG. 1 wherein analog apparatus to store digital information comprising a plurality of message units is shown generally at 1. Digital message units each comprising a plurality of bits that represent, for example, $2^0$, $2^1$, $2^2$, etc. may be fed from a computer through a buffer register (neither is shown in figures) to a storage register and counter 7, thence through switches 16 to a ladder network 6. The storage register 7, the switches 16 and the ladder network 6, acting in combination, serve as a digital-to-analog converter to provide an output voltage signal the voltage level of which is determined by the bit content of the message unit received from the computer. The voltage signal is fed to a capacitance array 15 adapted to receive and store the voltage signal. Switch means is provided to effect transfer of the voltage signal from the converter to a capacitance C of the array, which may be considered as representing the plurality of storage capacitances $C_1$, $C_2$, $C_k$, etc., and the switch means is adapted to display the signal on any particular storage capacitance to a comparator 14 for purposes hereinafter discussed. The switch means comprises a first switch, $S_A$, adapted to connect the capacitance storage means 15 to the converter, a second switch, $S_B$, adapted to connect the capacitance storage means 15 to the comparator 14, and a plurality of further switches, here designated $S_1$, $S_2$, $S_k$, etc., serially connected with the individual storage capacitances $C_1$, $C_2$, $C_k$, etc., respectively in the legs of the array. As mentioned herein, the switches $S_1$, $S_2$, $S_k$, etc., are preferably of the FET type which allow some charge leakage from the storage capacitances and it is necessary that the storage capacitance periodically be returned to the original voltage level, as now explained.

To effect updating the switch $S_A$ is opened and the switch $S_B$ is closed by appropriate control circuitry 8, and the stored signals are sequentially regenerated beginning with the signal on $C_1$. Control of the switches $S_1$, $S_2$, $S_k$, etc., is effected by an address matrix 17, the switch $S_1$ being closed at the same time as the switch $S_B$ to display the voltage signal on the capacitance $C_1$ to one input of the comparator 14. The other input to the comparator is derived from the converter which receives input pulses from a digital-to-analog clock 10 which feeds the pulses to the counter 7, the digital bit output $2^0$, $2^1$, $2^2$, etc. of the counter being fed along lines 3, 4, 5 etc., respectively, through the switches 16 to the ladder network 6 where actual conversion occurs as a staircase function, bit-by-bit, as the digital count progresses. The network 6 consists of a plurality of series and parallel resistances designated 2R and R, respectively, to indicate relative resistance values, and the individual switches in the block 16 function to apply voltages, in a binary sequence, across the various resistances in the ladder network of FIG. 3. The count increases in the counter 7 until the output signal from the network 6 is at a voltage level representative of the lowest number of digital bits greater than or equal to the message unit represented by the displayed signal. When the latter condition exists, a signal initiated by a flip-flop 19 in FIG. 4 disables an AND circuit 20 thereby disconnecting the clock 10 from the counter 7 to terminate the count. The count thereby determined is, thus, the digital equivalent of the analog voltage on the capacitance $C_1$, and this count can be read out on a readout device 9 (fed by conductors 3', 4', 5', etc.) and/or the analog equivalent voltage can be passed back to the capacitance $C_1$ by opening $S_B$ and closing $S_A$, with $S_1$ in the closed position. The other individual storage capacitances can similarly be updated, sequentially, and, following the updating, power to the system can be removed with the exception of the power to a memory clock 20' and a power-on flip-flop in the control circuitry. (If the switches $S_1$, $S_2$, $S_k$, etc. require a bias different than ground to keep them off, that bias must be furnished also.)

Figure 4:
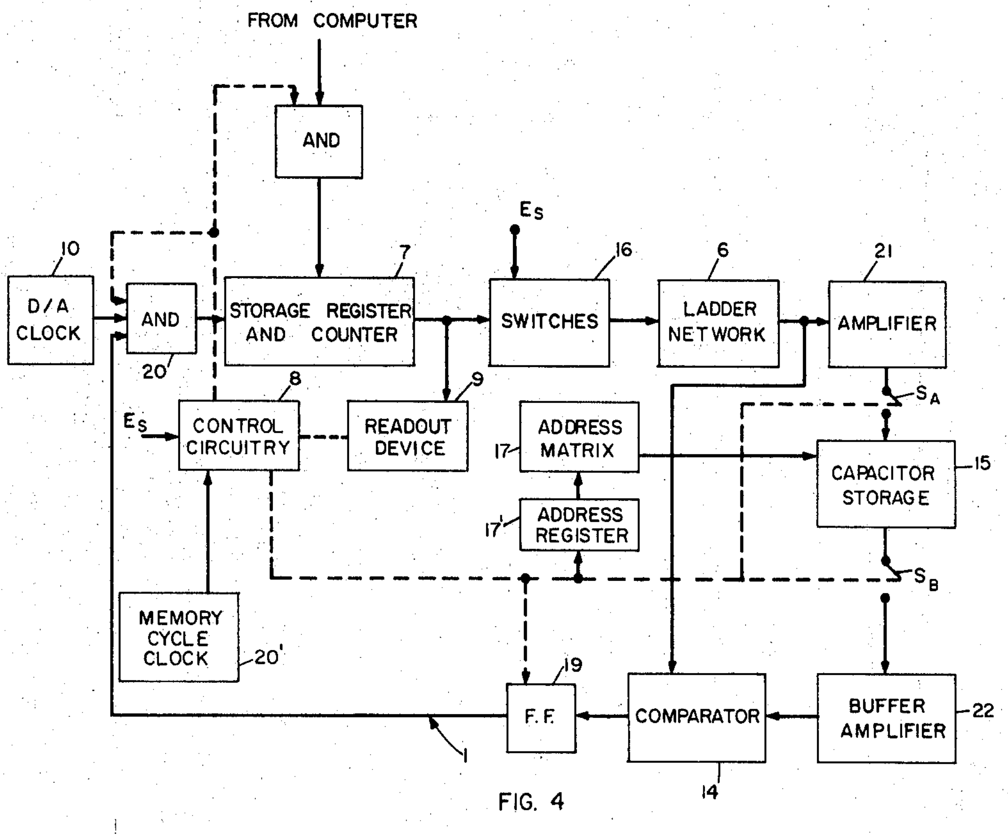
FIG. 4 is a block diagram of the embodiment disclosed in FIG. 1 but containing additional circuit elements.

In operable apparatus, as shown in FIG. 4, the ladder network output is fed through an amplifier 21 to the capacitance storage 15 and a buffer amplifier 22 appears between the capacitance storage 15 and the comparator 14. Buffer registers are used to store message units pending deposit at a proper address in the memory; the proper address is determined by constant comparison by a buffer address memory (in the control circuitry 8) connected to monitor an address register 17' which in turn controls the address matrix 17. In this way the buffer address memory controls transfer of messages between the computer and the storage capacitance both as to location of such messages (into and out of storage) and the timing of the transfer. The control circuitry contains switching to connect input power $E_S$ to the system and it contains, as well, read pulse one shot circuitry, write pulse one shot circuitry and suitable other circuitry to effect the functions herein discussed.

The allowable time lapse between updatings can be determined for any particular system. In this connection, the restoration of charge must occur before the voltage level on the storage capacitance has dropped the equivalent of one digital bit, as previously discussed. Thus, the period between restoration is determined by the rate of leakage and by the time necessary to restore the charge on each and every storage capacitance of which the memory consists. As previously mentioned, once the message units are stored, power to the system is removed, except as noted, and is reapplied at some predetermined later time upon a signal from the memory clock 20', again to regenerate the analog voltages on the capacitances $C_1$, $C_2$, $C_k$, etc. sequentially beginning with the first.

In the previous discussion, the emphasis is placed on the updating facets of the invention. It should be pointed out, however, that readout of the message equivalents of stored information on particular capacitances $C_1$, $C_2$, $C_k$, etc. can be randomly done upon appropriate signals from the address matrix 17 and the control circuitry 8. If the switch $S_A$ is left open, the analog signal never passes to the capacitance storage 15 for updating, and the particular capacitance read is available to store another message.

The time required to update the memory is inversely proportional to the clock 10 frequency. However, power to perform updating is also inversely proportional to frequency. As discussed previously, the frequency of updating is in part determined by charge leakage from storage. The switches $S_1$, $S_2$, $S_k$, etc. in the individual legs of the memory array 15 can be rendered more effective by connecting further like switches in series therewith or by various other schemes.

Figures 5A, 5B:
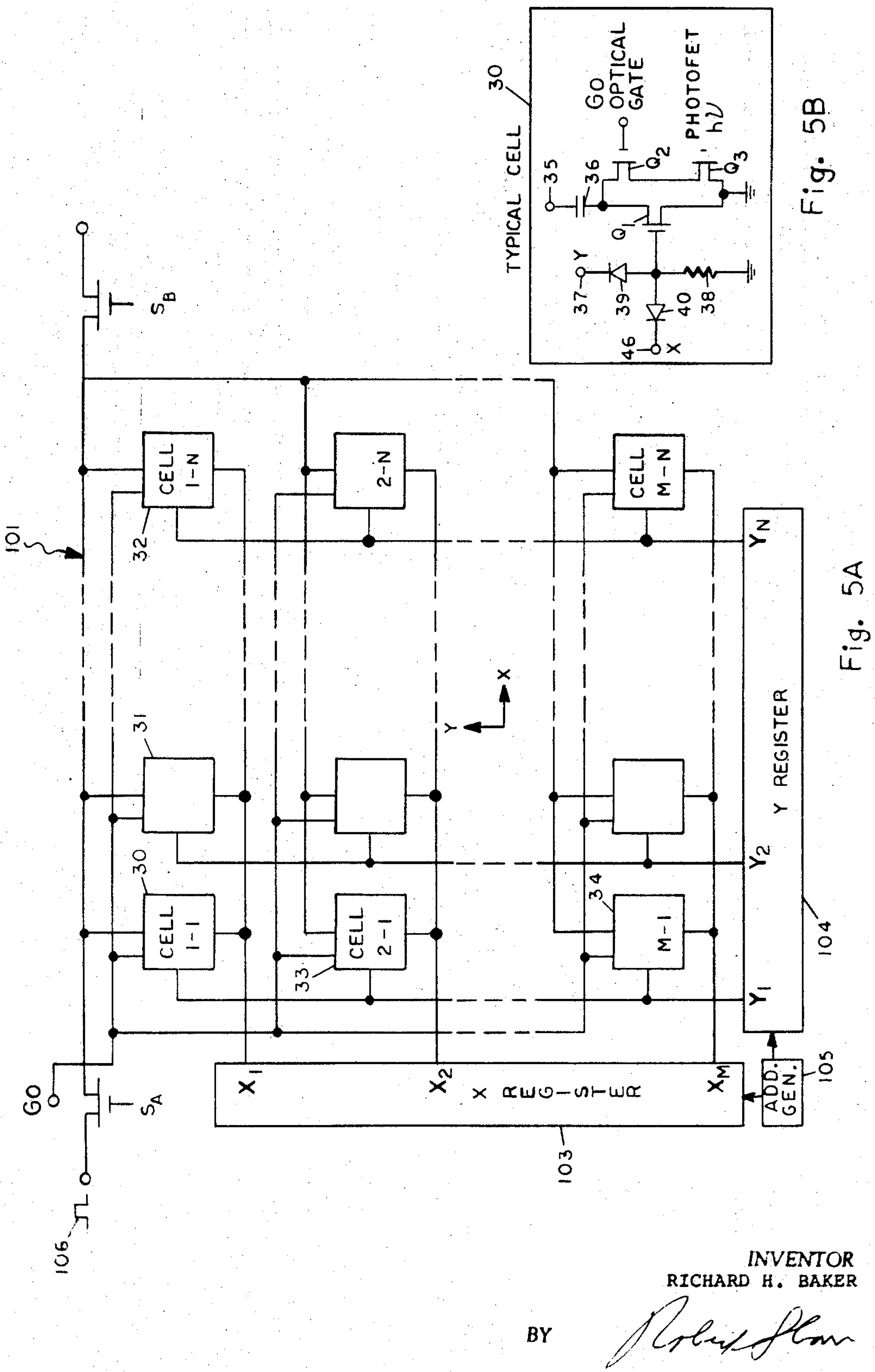
FIG. 5A is a schematic, partially in block diagram form, of a modification of the storage memory system shown in FIG. 2 and shows a number of memory cells in the form of a matrix.
FIG. 5B shows details of one of the cells in FIG. 5A.
Figure 7:
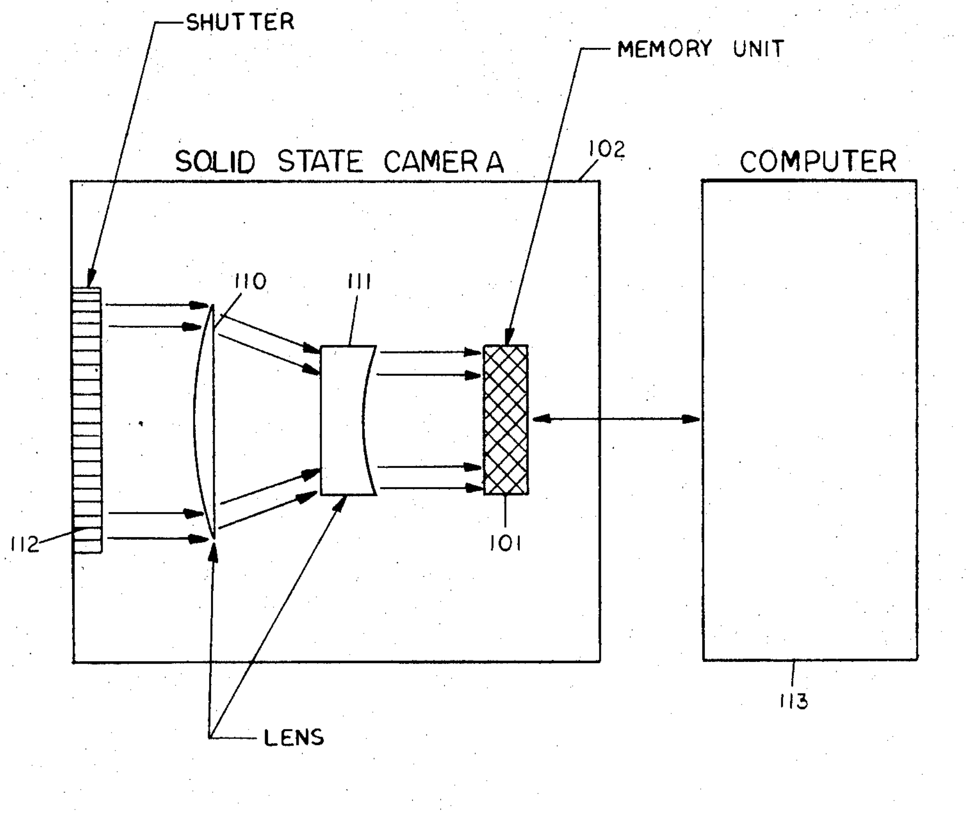
FIG. 7 is a schematic representation of a camera containing the memory system of FIG. 6.

The memory system discussed above is primarily concerned with receiving, storing and transmitting digital information. It is shown hereinafter that the system may be used, as well, to perform a transducer-type function wherein the information delivered to and stored in the memory system is originally not digital, but is, rather, in some other form, and is converted to a digital signal; or a digital signal, can, conversely, be changed in form. Specifically, in the system discussed in greatest detail hereinafter, the memory, which is designated 101 in FIGS. 7 and 5A, is employed as part of a solid-state camera 102, the recorded image being stored in an array of capacitance charging circuits, similar to those discussed above, disposed in a matrix of X-direction rows and Y-direction columns to provide a two-dimensional electrically stored equivalent of a scene. The scene, as discussed later in detail, thereby appears as a message in the array in the M-level voltages in the various storage capacitances, and the voltages can be updated in the manner previously described. Furthermore, since the voltage on each capacitance in the matrix-form array can be converted to its digital equivalent, the digital equivalent can be stored, typically, by being transmitted to some remote point and this digital equivalent can later (or simultaneously) be re-converted to analog through the use of a matrix-form array properly keyed to the pickup device-or upon some other device such as a television tube or the like.

Figure 6:
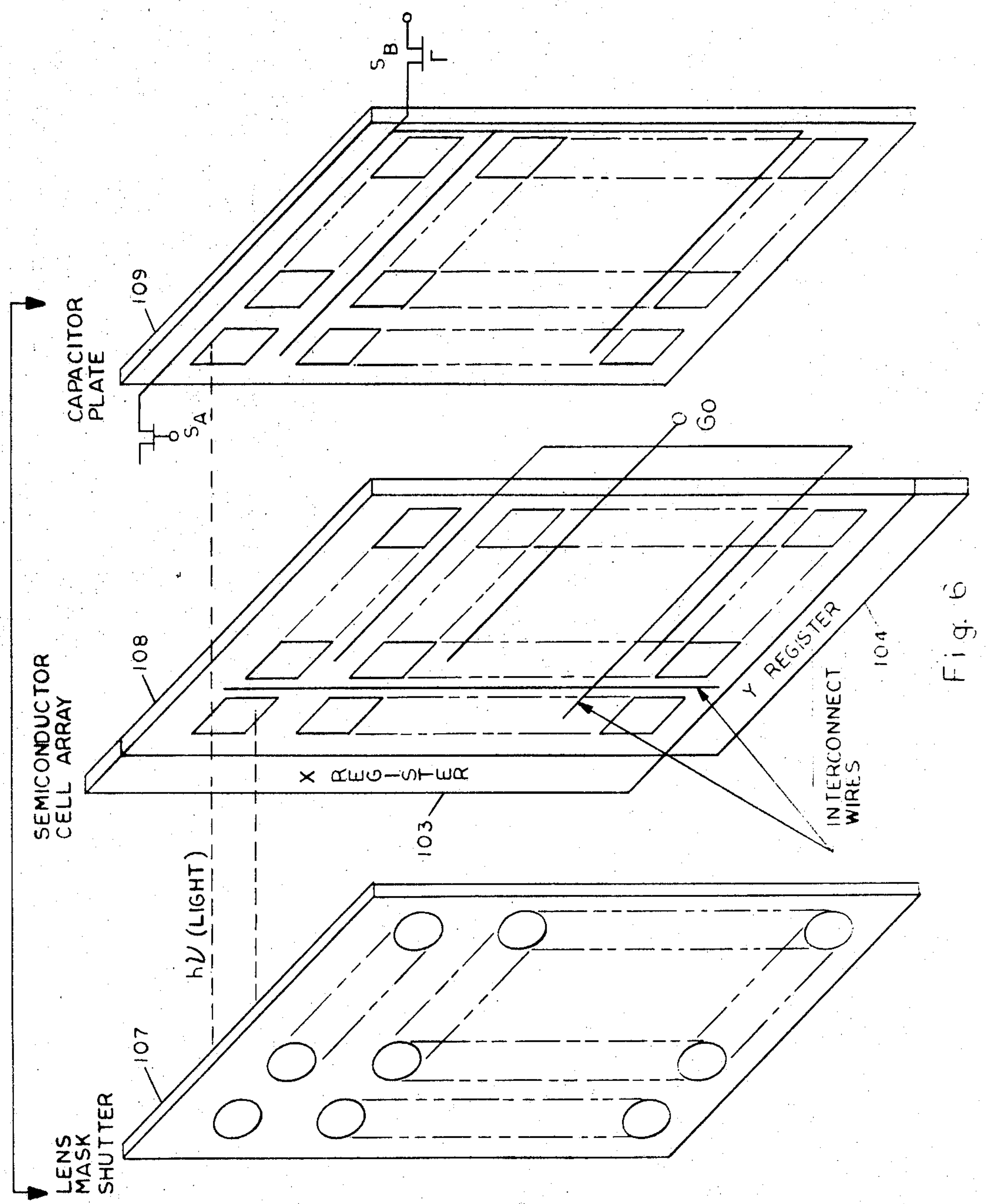
FIG. 6 is a blow-up isometric view of a memory system for positioning at the image plane of a solid-state camera.

With reference to FIG. 5A, the X-direction rows comprise the cells or charging circuits numbered 30, 31 and 32, for example, and the Y-direction columns comprises the cells or charging circuits numbered 30, 33 and 34, for example. A particular cell can be charged to an M-level voltage, as before. With reference to the cell 30 shown in detail in FIG. 5B, charging can be effected by applying a voltage across the cell 30 at Go, which has the effect of closing the switch labeled $Q_2$; the switch $S_A$ is also closed and a voltage pulse 106 (which can be supplied by the digital-to-analog converter) is applied between the point designated 35 and ground. A photofet $Q_3$ acts as a switch in series with the switch $Q_2$ to allow a series capacitance 36 to charge. A photofet is a radiation-sensitive field effect transistor which allows passage of electric current as a function of light striking a light sensitive surface. It acts like a variable resistance which varies from some very high value when no radiation is impinged thereon to some low value when exposed to radiation. Thus, when the switch $Q_2$ is in a conducting state and a voltage pulse is applied at 35, the capacitance 36 will charge at a rate which is a function of the amount of light striking the photofet $Q_3$. The pulse 106 acts analogously to the conventional shutter of a camera, the pulse height being equivalent to the shutter opening and the pulse width being equivalent to shutter speed--but, of course, a mechanical shutter can be used. Updating is accomplished in the manner before discussed, the updating of a particular cell being determined by appropriate address signals from a first or X-register 103, which is connected to control the field effect transistor switches in the rows, and a second or Y-register 104, which is connected to control the field effect transistor switches in the columns. The registers 103 and 104, in turn, are controlled by an address generator 105. The V-register address signal is applied at 37 to cause a diode 39 to conduct and the X-register address signal is applied at 46 to cause a diode 40 to conduct, the diodes 39 and 40 acting, in combination, as an AND gate to control a switch $Q_1$ which performs similarly to the switches $S_1$, $S_2$, $S_3$etc. The semiconductor switches $Q_1$, $Q_2$, $Q_3$, and the diodes 39, 40, etc. can be grown on a chip 108 along with the X-register 103 and the Y-register 104, as shown in FIG. 6. The storage capacitances 36 etc. can be grown on a chip 109, and the chips 108 and 109 are electrically interconnected. A mask 107 (this can also be a lens or a shutter) can be applied over the chip 108 to mask out all surface areas thereof other than the areas occupied by the photofet switch elements. The memory unit 101 can be a sandwich comprising the elements designated 107, 108 and 109; and, of course, all can be formed on postage-stamp size composite chip in which the storage capacitance can be the gate-to-substrate capacitance of one of the field effect transistors in the respective cell. It should be appreciated that it is the light-sensitive field effect transistors only that need be placed at the image plane of the camera 102 to receive incoming radiation (and the mask 107, if used) and the light-sensitive field effect transistors only need be positioned in matrix form; but, most appropriately, all the elements above-discussed will appear as shown. Collimating and focusing of light in the camera is accomplished by lenses 110 and 111. The voltage Go can be plus or minus because field effect transistors are bipolar. A conventional shutter 112 can be used with appropriate changes in electrical circuitry. Signals to and from the camera 102 arise and are received by an element 113 in FIG. 7, which is labeled "computer." It will be appreciated by workers in this art, particularly in view of the above explanation, that the computer 113 is a digital computer but it contains most of the circuit elements shown in FIG. 4, as well.

A few further matters are of interest. The image stored in the memory unit 101 can be updated, erased, or it can be altered by applying an opposite-polarity voltage thereto. Also, a resistance can be placed in series with the capacitance circuit to change the time constants and thus affect exposure. In addition, the image in memory can be transmitted to a remote point and stored or displayed; another image can be produced and transmitted, etc., thereby providing a series of reproducible images of an object or scene or the like. Furthermore, in connection with this radiation-transducer function, it is not difficult to focus attention of the camera or cause the camera to concentrate on a particular part or area of a scene, much as the eye does. That function is accomplished, for example, by programming the X and Y registers to read or cause to be read a particular row or group of rows and a particular column or group of columns. By thus focusing attention, detailed differences in radiation from contiguous points in these prescribed areas can be measured and/or analyzed with greater resolution in order to distinguish sharp edges (i.e., edging) etc., which are of interest for distinguishing geometric shapes and the like. The elements of the device can be discrete parts or integrated circuits. Furthermore the function of $Q_2$ and $Q_3$ can be combined in one field effect transistor that is both radiation sensitive and voltage sensitive.

In the foregoing explanation, the information stored in the capacitance memory bank originates as the output of a digital computer or is in the form of electromagnetic radiation. It should be apparent, however, from the explanation that the capacitance storage system has use for storage of information generally in those circumstances in which the information to-be-stored is such that it can be converted to a voltage signal by some form of transducer. The terms "light" and "radiation" are intended to denote radiation within and without the visible spectrum.

These and other modifications of the invention herein described will occur to those skilled in the art, and all such modifications are considered to fall within the spirit and scope of the invention as defined in the appended claims.

What is claimed is:

1. Analog apparatus adapted to store digital information comprising a plurality of message units, that comprises, converter means for converting each of the message units to a voltage signal, the level of each signal being determined by the bit content of the message unit represented, capacitance means comprising a plurality of storage capacitances, each to receive and store one said voltage signal, each capacitance making up one leg of a storage array, a field effect transistor serially connected with the capacitance in each leg, switch means which includes the field effect transistors in the legs of the array operable to connect individual storage capacitances of the capacitance means to the converter means to transfer each signal from converter means to a capacitance of the array, control means connected to effect operation of the switch means thereby to effect transfer of a signal from the converter means to the array, an address matrix controlled by said control means and connected to control the field effect transistors to determine which of the storage capacitances of the array shall receive any particular signal, the switch means being further adapted to display the signal on any particular storage capacitance in the array to a comparator, the comparator being connected to receive an output signal from the converter means representative of the lowest number of digital bits greater than or equal to the message unit represented by the displayed signal on said particular storage capacitance thereby to determine the voltage level of the displayed signal in terms of its digital equivalent, said switch means including, in addition to the serially connected field effect transistors, a first switch connecting the capacitance means to the converter means and a second switch connecting the capacitance means to the comparator.

2. Analog apparatus adapted to store digital information comprising a plurality of information units, that comprises, converting means for converting each information unit to a voltage signal, the level of each signal being determined by the digital content of the information unit represented, a storage array having a plurality of capacitance charging circuits each comprising a field effect transistor and making up one leg of the storage array, switch means including the field effect transistors in the legs of the array operable to connect individual capacitance charging circuits to the converting means to transfer each signal therefrom to the capacitance charging circuits of the array to store signals therein, and an address matrix connected to control the field effect transistors to determine which capacitance charging circuit of the array shall receive any particular signal, the switch means being further adapted to display the signal on any particular capacitance charging circuit to comparator means, the comparator means being connected to receive an output signal from said particular capacitance charging circuit and to compare it with a digital equivalent generated by the converting means in order to determine the level of signal stored in said particular capacitance charging circuit, said switch means including, in addition to the field effect transistors, first and second switches respectively connecting the capacitance charging circuits to the converting means and the comparator means.

3. Analog apparatus adapted to store digital information comprising a plurality of information units, that comprises, a source of voltage signals each representing an information unit, the level of each signal being determined by the digital content of the information unit represented, a storage array having a plurality of capacitance charging circuits each comprising an electric switching device and making up one leg of the storage array, switch means including the electric switching device in each leg of the array operable to connect individual capacitance charging circuits to said source to transfer each signal therefrom to the capacitance charging circuits of the array for storage therein, and an address matrix connected to control the switching devices to determine which capacitance charging circuit of the array shall receive any particular signal, the switch means being further adapted to display the signal on any particular capacitance charging circuit to comparator means, the comparator means being connected to receive an output signal from said particular capacitance charging circuit and to compare it with a digital equivalent generated by said source in order to determine the level of signal stored in said particular capacitance charging circuit, said switch means including, in addition to the electric switching devices, first and second switches respectively connecting the capacitance charging circuits to said source and to said comparator means.

4. Analog apparatus that comprises, in combination, a storage array having a plurality of capacitance charging circuits each comprising an electric switching device and making up one leg of the storage array, means for charging the individual charging circuits of the array to a voltage level representing a message to be stored, a source of digital information, converting means operable to convert the digital information to an M-level voltage output determined by the bit content thereof, comparator means connected to receive the M-level voltage output as a first input thereto, switch means including the electric switching device in each leg of the array operable to connect individual capacitance charging circuits to the converting means, the switch means being further operable to connect individual capacitance charging circuits of the array to the comparator means as a second input thereto, the comparator means being thereby adapted to receive an output signal from an individual capacitance circuit and to compare it with a digital equivalent generated by the converting means in order to determine the level of the stored signal in terms of its digital equivalent, said switch means including, in addition to the electric switching devices, first and second switches respectively connecting the capacitance charging circuits to the converting means and the comparator means, and address matrix means connected to control sequencing of the capacitance charging circuits of the array.

5. Analog apparatus as claimed in claim 4 in which the electric switching device in each leg of the array is a field effect transistor and in which each of the capacitance charging circuits comprises a capacitance and a field effect transistor switch.

6. Analog apparatus as claimed in claim 5 in which each field effect transistor is voltage sensitive and radiation sensitive and in which field effect transistor switches are arranged in a pattern of Y-direction columns and X-direction rows to form the image plane of a solid-state camera.

7. Analog apparatus as claimed in claim 6 in which each charging circuit is electrically connected across a source of electric potential so that the individual capacitance in each leg of the array can be charged when the corresponding switch in that particular leg of the array is closed.

8. Analog apparatus as claimed in claim 7 in which the field effect transistor switches are closed either in response to a voltage signal connected to the control electrode thereof or upon being exposed to radiation and which includes a shutter positioned, upon opening, to expose the field effect transistor switches of the pattern to radiation, thereby to charge each individual capacitance of the array to a voltage level determined by the level of the radiation striking said individual capacitance.

9. Analog apparatus as claimed in claim 8 in which the address matrix means comprises a first address register connected to control the field effect transistor switches in the rows and a second address register connected to control the field effect transistor switches in the columns, thereby to connect any particular capacitance in the pattern to the comparator to relate the charge stored therein in terms of its digital equivalent.

10. Analog apparatus as claimed in claim 8 in which the converting means is a digital-to-analog converter which acts also as the source of electric potential.

11. Analog apparatus as claimed in claim 4 in which the electric switching device in each leg of the array includes, in combination, a field effect transistor in parallel with a further field effect transistor and a radiation-sensitive transistor and in which each capacitance charging circuit making up each said leg includes, in addition to said electric switching device, a capacitance in series with said device.

12. Analog apparatus as claimed in claim 11 in which the capacitance charging circuits are arranged in a pattern of X-direction rows and Y-direction columns to form a matrix, said matrix being located at the image plane of a solid-state camera, the radiation sensitive transistors being positioned to receive any incoming radiation.

13. Analog apparatus as claimed in claim 12 includes means operable to perform the shutter function of the camera.

14. Analog apparatus as claimed in claim 13 in which the means to perform the shutter function is a source of pulse voltage connected to each said further field effect transistor, the height of the pulse being the equivalent of the conventional shutter opening and the pulse width being the equivalent of the conventional shutter speed.

15. Analog apparatus as claimed in claim 4 in which the converting means is a digital-to-analog converter which acts also as a voltage source in said means for charging the individual charging circuits.

* * * * *